United States Patent
Lim

(10) Patent No.: US 8,055,304 B2
(45) Date of Patent: Nov. 8, 2011

(54) MOBILE COMMUNICATIONS TERMINAL HAVING ADAPTIVE MEMO FUNCTION AND METHOD FOR EXECUTING MEMO FUNCTION

(75) Inventor: Ju-Hee Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1099 days.

(21) Appl. No.: 11/413,165

(22) Filed: Apr. 28, 2006

(65) Prior Publication Data
US 2006/0246957 A1 Nov. 2, 2006

(30) Foreign Application Priority Data
Apr. 29, 2005 (KR) .......................... 10-2005-0036318

(51) Int. Cl.
*H04M 1/00* (2006.01)
(52) U.S. Cl. ...................... 455/566; 340/309.7; 345/169
(58) Field of Classification Search .................. 455/566; 340/309.7; 345/169
See application file for complete search history.

(56) References Cited

U.S. PATENT DOCUMENTS

| | | | | |
|---|---|---|---|---|
| 5,889,888 A * | 3/1999 | Marianetti et al. | ............ | 382/187 |
| 5,933,783 A * | 8/1999 | Kawakami et al. | ............ | 455/566 |
| 7,218,926 B2 * | 5/2007 | Bocking et al. | ............... | 455/419 |
| 7,366,547 B2 * | 4/2008 | Hasegawa et al. | ............ | 455/566 |
| 7,483,720 B2 * | 1/2009 | Yajima | ........................... | 455/566 |
| 7,929,986 B2 * | 4/2011 | Kuwahara et al. | ......... | 455/550.1 |
| 2001/0029193 A1 * | 10/2001 | Ishigaki | .......................... | 455/566 |
| 2002/0087628 A1 * | 7/2002 | Rouse et al. | ................... | 709/203 |
| 2004/0196866 A1 * | 10/2004 | Park et al. | ...................... | 370/466 |
| 2004/0222975 A1 * | 11/2004 | Nakano et al. | ................ | 345/173 |
| 2006/0058063 A1 * | 3/2006 | Bocking et al. | ............ | 455/556.2 |

FOREIGN PATENT DOCUMENTS

CN 1604669 A 4/2005
WO WO-2004/025974 A1 3/2004

OTHER PUBLICATIONS

"CECT d818 catalog," User manual, Dabodal limited corporation, Nov. 30, 2004.
Technique for application, "protect your word files," Let's keep your word file well, pp. 106, Dec. 31, 2000.

* cited by examiner

*Primary Examiner* — Lester Kincaid
*Assistant Examiner* — Steven Kelley
(74) *Attorney, Agent, or Firm* — Birch, Stewart, Kolasch & Birch, LLP

(57) ABSTRACT

Provided is a mobile communication terminal and more particularly a mobile communication terminal for easily executing a memo function and a method thereof, whereby the memo function can simply be executed according to a state of the mobile communications terminal to thusly easily compose a memo or easily confirm memo contents, the composed memo can be displayed on a standby screen to thus allow a user to recognize the memo being composed and also allow the user to confirm the memo contents directly on the standby screen without undergoing complicated menu selection procedures, the memo can automatically be stored upon ending a call or occasionally, and the composed memo can immediately be sent in a text message format.

7 Claims, 10 Drawing Sheets

MOBILE COMMUNICATIONS TERMINAL HAVING ADAPTIVE MEMO FUNCTION AND METHOD FOR EXECUTING MEMO FUNCTION

BACKGROUND OF THE INVENTION

1. Field of the Invention

The present invention relates to a mobile communication terminal, and particularly, to a mobile communication terminal for facilitating an execution of a memo function, and a method thereof.

2. Background of the Invention

In general, a mobile communication terminal is equipped with various additional functions as well as a voice communication function. For example, the additional functions may include a short message transmission function, a memo function, a phone book function, an alarm function, and the like, and other functions are being provided to the terminal in recent times.

A method for executing additional functions of a related art mobile communication terminal will now be explained hereafter.

First, a menu calling (selecting) key equipped in the terminal is entered (pressed) to display a sub menu list. An additional function menu is selected from the sub menu to display the additional function list contained therein. From the displayed additional function list, a certain function which a user want to use is selected to be then executed.

In order to select the sub menu or the additional function displayed, a navigation key in a keypad is used to scroll up or down a selection bar to a desired additional function. Thereafter, a confirmation key is entered (pressed) or any numeral key in the keypad is used to directly enter the number assigned to each additional function.

Regarding a memo function among the additional functions of the mobile communication terminal, for example, the related art mobile communication terminal must disadvantageously perform many steps of a menu selection procedure as described above in order to compose a memo or confirm contents included in a previously composed memo.

In the related art mobile communication terminal, the complicated execution procedure for the memo function makes it difficult to fast execute the memo function during a call communication. Furthermore, even through having composed a memo, it may be possible for a user to habitually terminate the his terminal in a state of not storing the composed memo, and also the user may not recognize even the memo he has composed.

SUMMARY OF THE INVENTION

One aspect of the present invention involves the recognition by the present inventors of the drawbacks in the related art, as explained above. Based upon such recognition, improvements in a memo function for mobile communication terminals can be achieved according to the present invention.

Certain features that may be part of the bandwidth allocation method and system will not be described in much detail, merely to prevent the characteristics of the present invention from being obscured. However, such additional features may also be part of the adaptive memo function system and method of the present invention, as would be understood by those skilled in the art.

An object of the present invention is to provide a mobile communication terminal for facilitating a composition of a memo during a call communication by making it possible to simply execute a memo function depending on a state of a mobile communication terminal, and a method thereof.

Another object of the present invention is to provide a mobile communication terminal for facilitating a confirmation of memo contents by making it possible to simply execute a memo function depending on a state of a mobile communication terminal, and a method thereof.

Still another object of the present invention is to provide a mobile communication terminal which is capable of improving a user's convenience to allow an automatic storing of a memo when ending a call communication, and a method thereof.

Yet another object of the present invention is to provide a mobile communication terminal capable of improving a user's convenience by allowing a displaying of a memo on a standby screen, and a method thereof.

Yet another object of the present invention is to provide a mobile communication terminal capable of improving a user's convenience by converting a memo into a text message for transmission, and a method thereof.

To achieve these and other advantages and in accordance with the purpose of the present invention, as embodied and broadly described herein, there is firstly provided a method for executing an adaptive memo function of a mobile communication terminal comprising: when entering a memo function execution command, determining a current state of the mobile communication terminal; displaying a memo contents input screen when it is determined the mobile communication terminal is in a communication state; and displaying a memo list screen when it is determined the mobile communication terminal is in a standby state.

According to a second embodiment of the present invention, there is provide a method for executing an adaptive memo function of a mobile communication terminal comprising: checking an elapsed time from a starting time point for composing a memo; comparing the elapsed time with a preset automatic memo storing time; and when the elapsed time matches the automatic memo storing time, automatically storing the memo.

According to a third embodiment of the present invention, there is provided a method for executing an adaptive memo function of a mobile communication terminal comprising: determining an operational state of a mobile communication terminal; when the mobile communication terminal is converted from a communication state into a standby state, automatically executing a memo function; and displaying a certain memo among memos stored in the mobile communication terminal on a standby screen according to a set environment of the memo function.

According to a fourth embodiment of the present invention, there is provided a method for executing an adaptive memo function of a mobile communication terminal comprising: when inputting a text message transmission command while executing a memo function, converting memo contents into a text message format; converting the memo function execution screen into a text message sending screen for displaying; and automatically inputting the memo contents converted into the text message format in a content field of the text message sending screen.

According to a fifth embodiment of the present invention, there is provided a method for executing an adaptive memo function of a mobile communication terminal in executing a memo function of the mobile communication terminal, the method comprising: storing a memo which is being composed by a certain time interval while composing the memo; and displaying contents in the memo which is being composed in a standby screen.

To achieve these and other advantages and in accordance with the purpose of the present invention, there is provide a mobile communication terminal having an adaptive memo function comprising: a key input unit (e.g., keypad, function buttons, touch-sensitive input device, etc. to allow audible, visual, and/or tactile inputs) for entering a key button for executing a memo function; a controller for determining a state of a mobile communication terminal when entering an execution key button of a memo function by the key input unit such that a display is controlled to display a memo contents input screen when the terminal is in a communication state, while the display is controlled to display a memo list screen when the mobile communication terminal is in a standby state; and the output unit (e.g., speaker, display unit, touch-screen, vibration unit, etc. to provide audible, visual, and/or tactile outputs) for displaying a memo function execution screen according to the state of the mobile communication terminal under the control of the controller.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Figure 1:
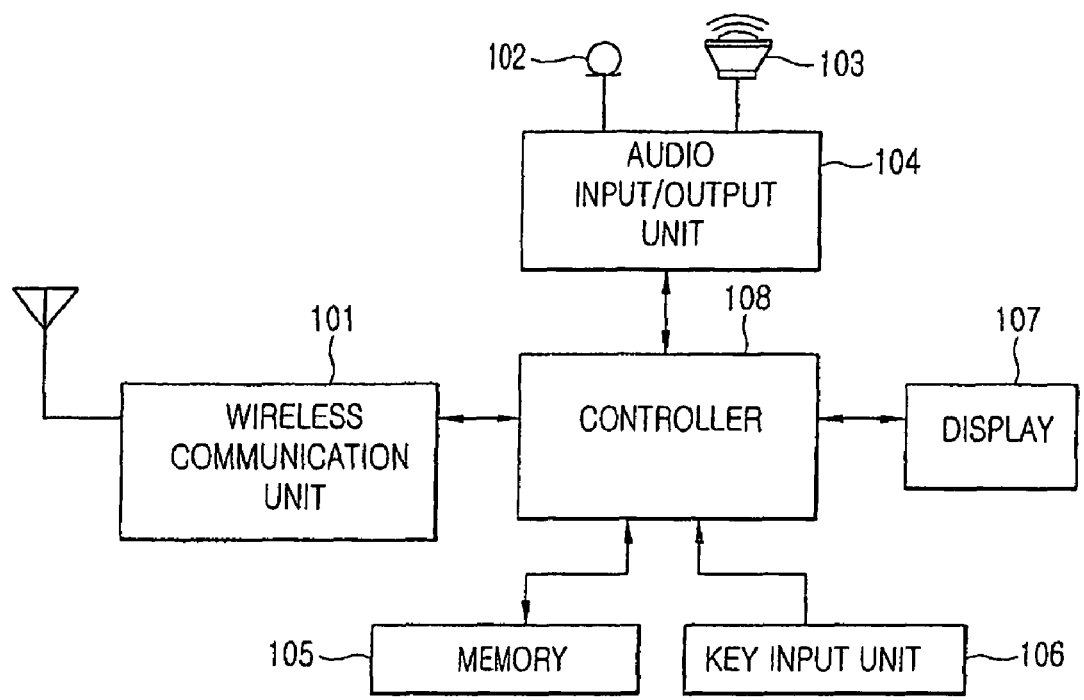
FIG. 1 is a diagram illustrating a construction of a mobile communication terminal having a memo function in accordance with the present invention.

FIG. 1 is a diagram illustrating a construction of a mobile communication terminal having a memo function according to the present invention. Hereafter, the term "mobile communication terminal" is intended to refer to and cover various types of communication devices (i.e. mobile stations (MS), user equipment (UE), handsets, PDAs, etc) that support mobility (or may be fixed) and allows communication of information via wired and/or wireless interfaces.

With reference to FIG. 1, a mobile communication terminal according to the present invention may include a wireless communication unit 101 for extracting audio and data signals from wireless signals which are transmitted and received through an antenna, an audio input/output unit 104 for inputting and outputting audio signals via a microphone 102 and a speaker 103, the audio signals being transmitted and received through the wireless communication unit 101, a memory [RAMs, ROMs, hard disk type memories, Flash memories, etc]105 for storing various data and programs which are required to control the mobile communication terminal, a key input unit 106 for detecting an entering of a key disposed in the mobile communication terminal, a display 107 (i.e. LCD, PDP, CRT, etc) for displaying information related to operations of the mobile communication terminal and execution of various functions, and a controller 108 for controlling each functional block.

However, it may be obvious that new functions may additionally be executed in the same named functional blocks depending on embodiments.

The key input unit 106 and the display 107 may generally be configured separately, but it must be considered that an input function and a display function can be combined into one such as a touch screen.

The controller 108 determines whether a key button for executing a memo function is entered by the key input unit 106. When the key button is entered to execute the memo function, the controller 108 controls the display 107 to display a screen for executing the memo function (i.e., a memo function execution screen).

The memo function execution screen may include an input screen for composing a memo or a list screen for checking memo contents. The memo function execution screen may be automatically displayed according to an operational state of the mobile communication terminal, or be directly displayed by a user's selection.

In order to automatically display the memo function execution screen, an environment for executing the memo function must previously be set.

For setting the environment, the controller 108 determines whether a key button for setting the environment of the memo function is entered by the key input unit 106. When the key button is entered to set the environment, the controller 108 controls the display 107 to thusly display a screen for the environment setup of the memo function as shown in FIG. 2.

FIGS. 2 through 6 are exemplary views showing a procedure for setting the environment of the memo function according to the present invention.

Figure 2:
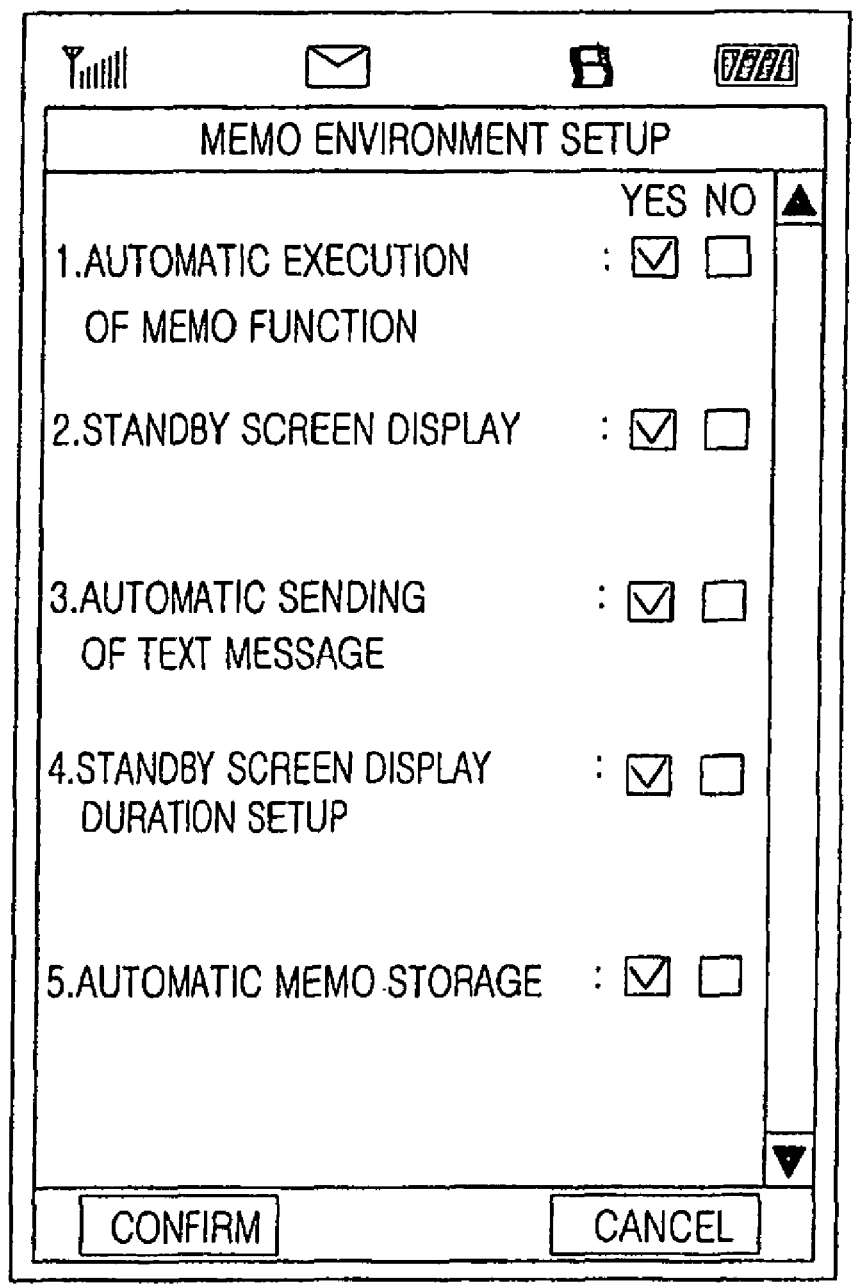
FIG. 2 is an exemplary view illustrating a screen for setting an environment of a memo function included in a memo function execution screen in accordance with the present invention.

As illustrated in FIG. 2, items for setting the environment may include a first item for selecting a method for automatically executing a memo function, a second item for selecting whether to display memo contents on a standby screen, a third item for selecting whether to automatically send the memo by converting the memo contents into a text message, a fourth item for setting a standby screen display duration when displaying the memo contents on a standby screen, and a fifth item for selecting a memo storage option.

Figure 3:
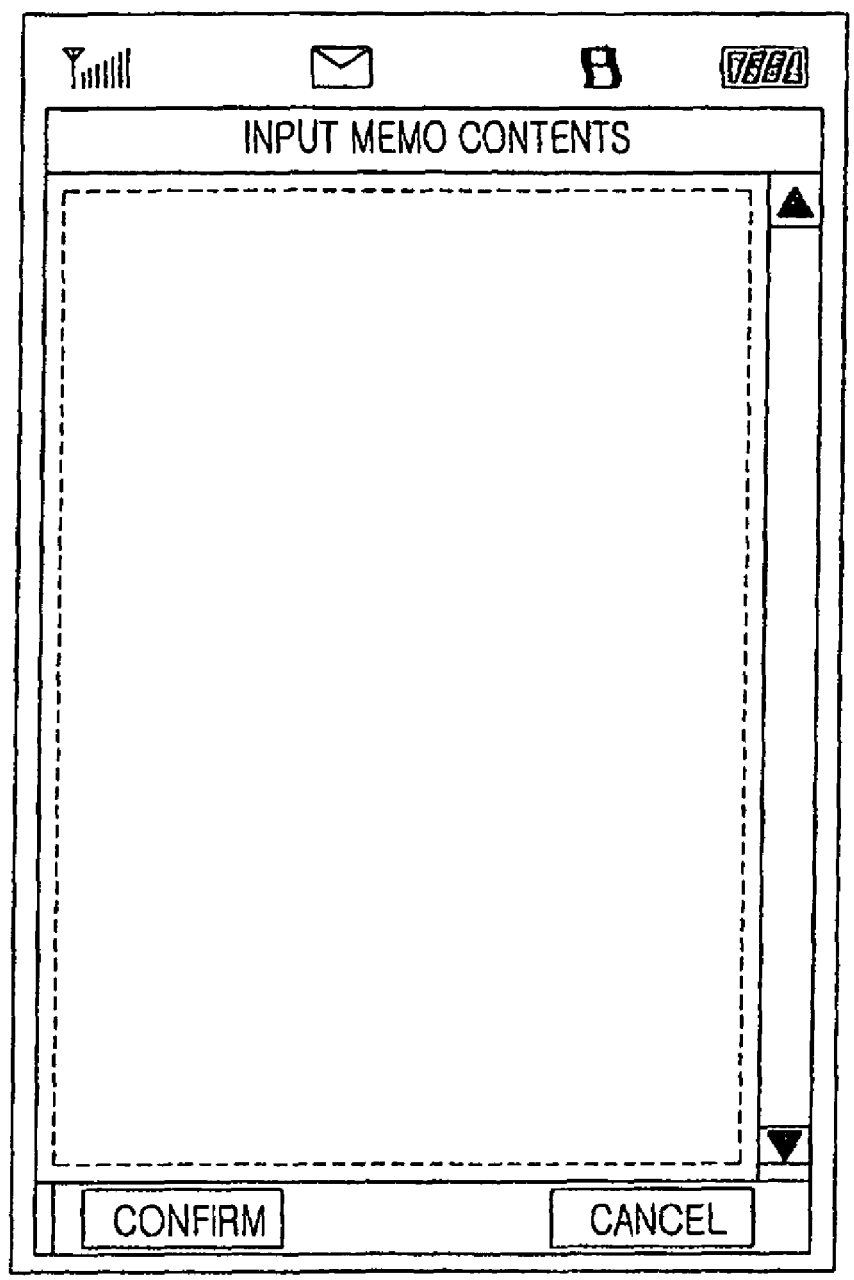
FIG. 3 is an exemplary view illustrating a memo contents input screen included in the memo function execution screen in accordance with the present invention.
Figure 4:
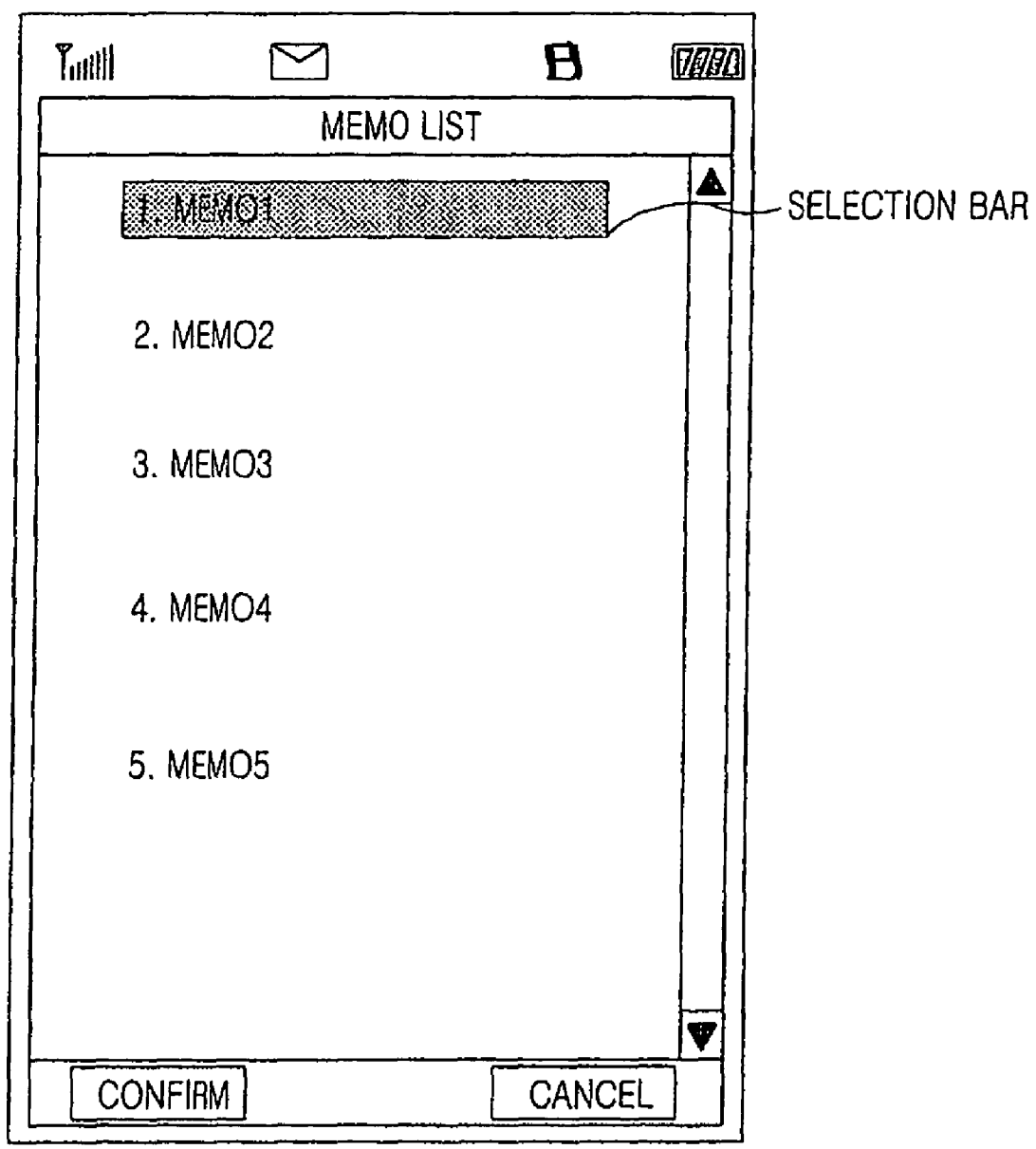
FIG. 4 is an exemplary view illustrating a memo list screen included in the memo function execution screen in accordance with the present invention.

First, the first item for selecting the method for executing the memo function can be used such that when entering a preset memo function execution button during a call communication, a memo contents input screen is automatically displayed as illustrated in FIG. 3, and when entering the memo function execution button in a non-communication state, a memo list screen is automatically displayed as illustrated in FIG. 4. When the first item is not selected, the memo function is executed according to the general memo selection procedure according to the related art.

Figure 5:
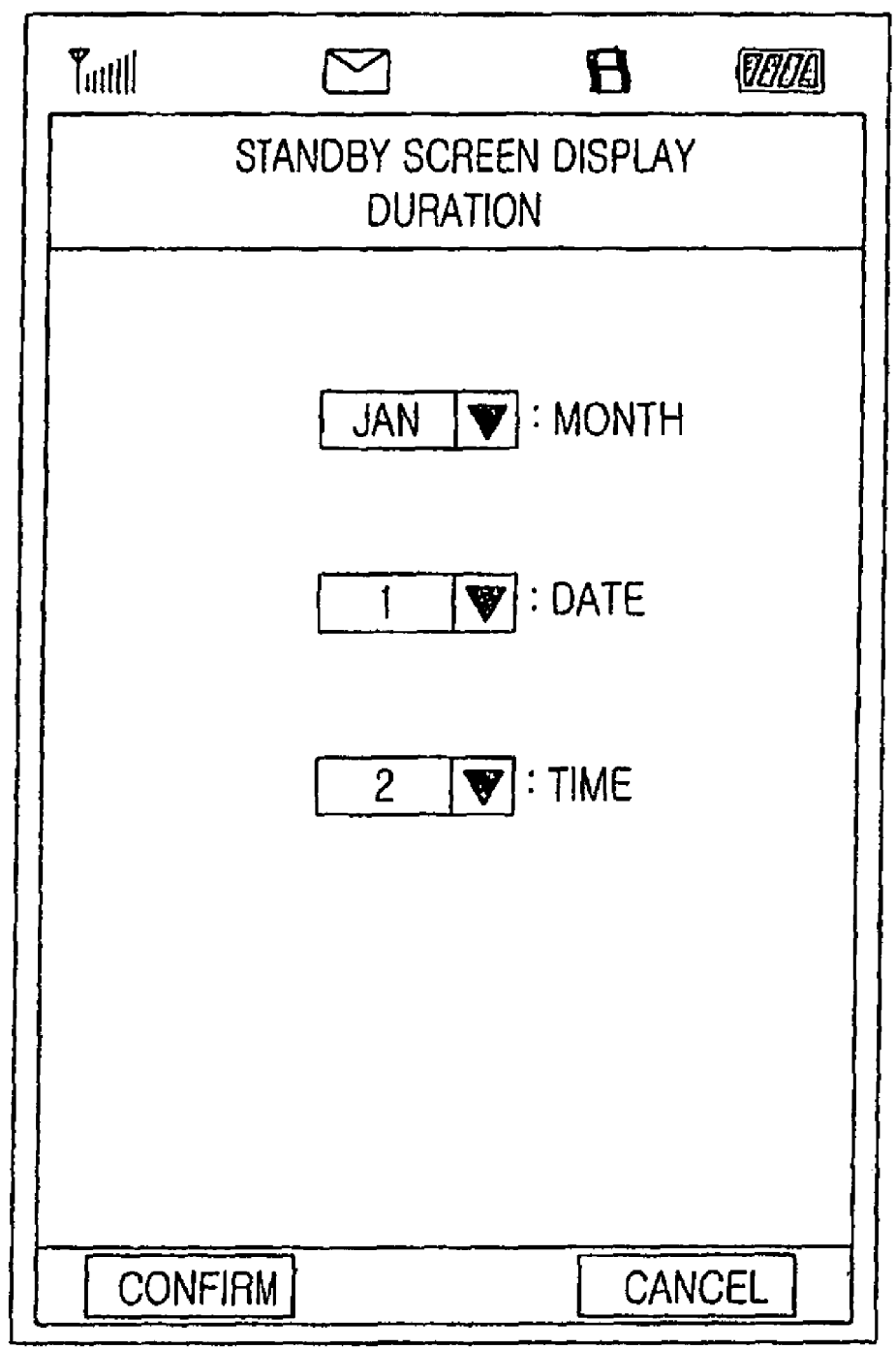
FIG. 5 is an exemplary view illustrating a screen for setting a standby screen display duration included in the screen for setting the environment of the memo function in accordance with the present invention.

The second item for selecting whether to display the memo contents on the standby screen can be used so as to display the most recently composed memo contents when the mobile communication terminal is in a standby state. When selecting in the second item setup screen a displaying of the memo contents on the standby screen, the fourth item of a standby screen display duration, as a detailed setup item for the second item, can be set as illustrated in FIG. 5.

The third item for selecting whether to send the memo contents in a text message format can be set when intending to send the memo contents in the text message format to another party. The third item can be used such that the pre-composed memo contents can be converted into the text message format to be then sent without composing a separate text message. The memo can be stored without inputting a separate key button and simultaneously be automatically moved to a text message sending screen. Here, the memo contents are automatically inputted into a content field of a text message, and thus the user can send the memo only by inputting another party's phone number. Here, the present invention will be explained with reference to incorporating/converting the memo contents into the text message format. However, it can be understood that the teachings and suggestions of the present invention are applicable to other types of message type/format in recent technology. [i.e. voice message format, multimedia message format, etc]

The fourth item can be used so as to set a duration for re-displaying the previously displayed standby screen regardless of the user's confirmation with respect to the memo contents. Therefore, when the display duration is set, the controller 108 displays the memo contents for the display duration and then re-displays the previously displayed standby screen. Here, if the user enters a memo contents confirmation button even when displaying the memo contents on the standby screen, the controller 108 terminates the memo contents displaying and then re-displays the previously displayed standby screen.

Figure 6:
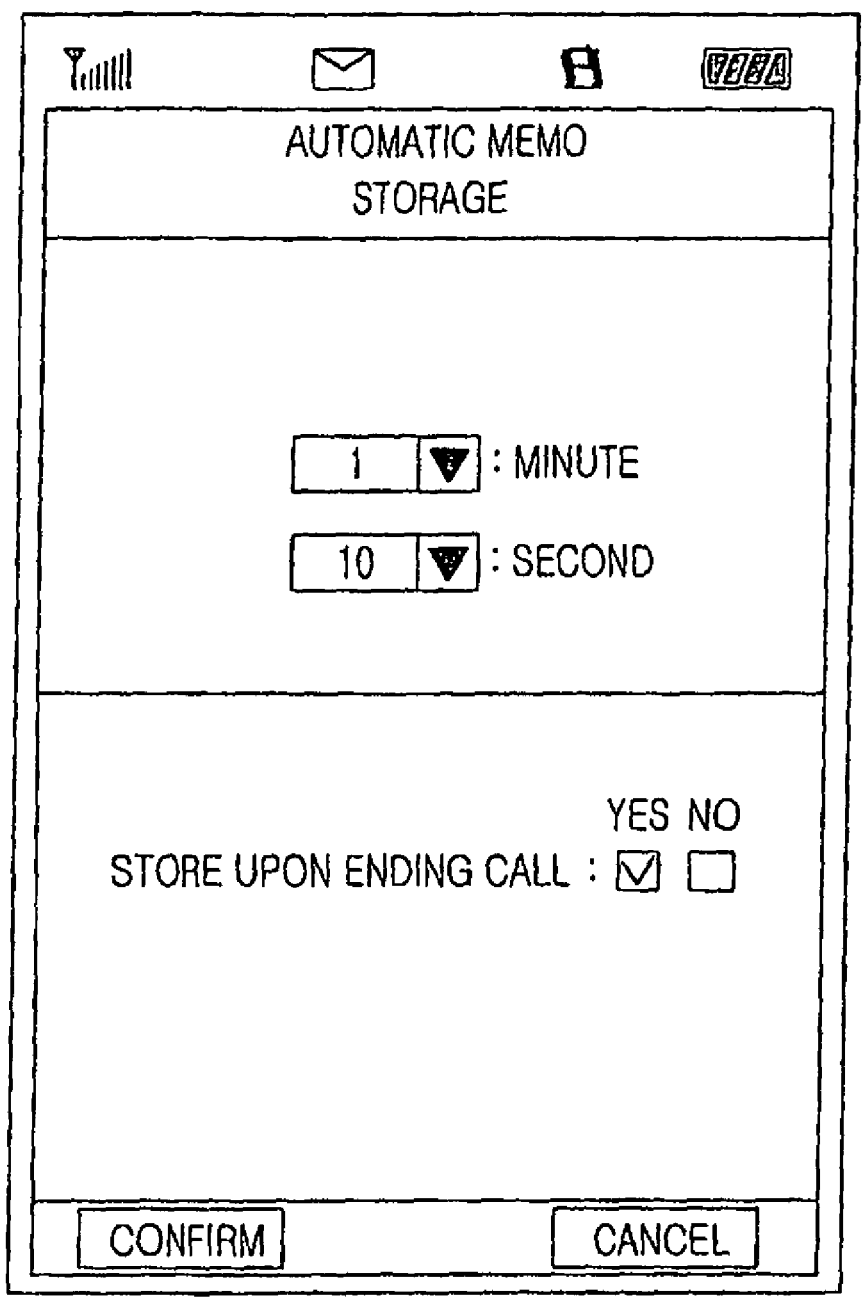
FIG. 6 is an exemplary view illustrating a screen for setting an automatic memo storage included in the screen for setting the environment of the memo function in accordance with the present invention.

The fifth item for setting the memo storage option can be used to set various options for automatically storing a memo which is being composed. The options, as illustrated in FIG. 6, may basically include an option for automatically storing a memo by a certain time interval during composing the memo, and may especially include an option for automatically storing the memo when forcibly terminating the mobile communication terminal by closing a folder or entering a termination button when ending the call communication, or when terminating the memo contents input screen without storing the memo contents which are being inputted (composed).

A user interface for displaying information related to each item for the environment setup is stored in a memory 105. Hence, the controller 108 detects the item information for setting the environment of the memo function and user interface data from the memory 105 to display the information and data, and stores set information inputted by the user in the memory 105.

After completely setting the environment for executing the memo function, when the key input unit 106 is used to enter a memo function execution button, the controller 108 determines an operational state of the mobile communication terminal. That is, the controller 108 determines whether the terminal is in the communication state.

When entering the memo function execution button in the communication state, the controller 108 displays the memo contents input screen as illustrated in FIG. 3, while when entering the memo function execution button in the non-communication state, the controller 108 displays a memo list screen as illustrated in FIG. 4.

Upon displaying the memo list screen, the user can select a memo which the user desires to confirm and then confirm the memo contents. When the memo contents input screen is then displayed, the user can compose a memo containing his desired contents. While composing the memo contents, the controller 108 checks whether a set automatic storing time has been elapsed, and accordingly automatically stores the memo by the set time according to the memo storage option set in the fifth item, or automatically stores the memo when ending the call communication even though a separate key button is not entered.

When ending the call communication, the controller 108 displays the stored memo contents on the display 107 according to the standby screen display option set in the second and forth items. The memo contents are displayed for the set display duration. When the user enters the memo contents confirmation button even in the memo display duration, the memo contents display is terminated and then the previously displayed standby screen is re-displayed.

In addition, when ending the call communication, the controller 108 converts the stored memo contents into the text message format according to the option for automatically sending a text message set in the third item. The controller 108 controls the display 107 to display the text message sending screen. Thereafter, the format-converted memo contents are inputted in a content field of the text message. Therefore, the user inputs another party's phone number in the text message sending screen to send the memo thereto.

When entering a certain text message sending button included in the text message sending screen, the controller 108 controls the wireless communication unit 101 to send the text message to the inputted phone number.

Hereinafter, an operation of the mobile communication terminal having such construction will now be explained in detail with reference to attached flow charts.

Figure 7:
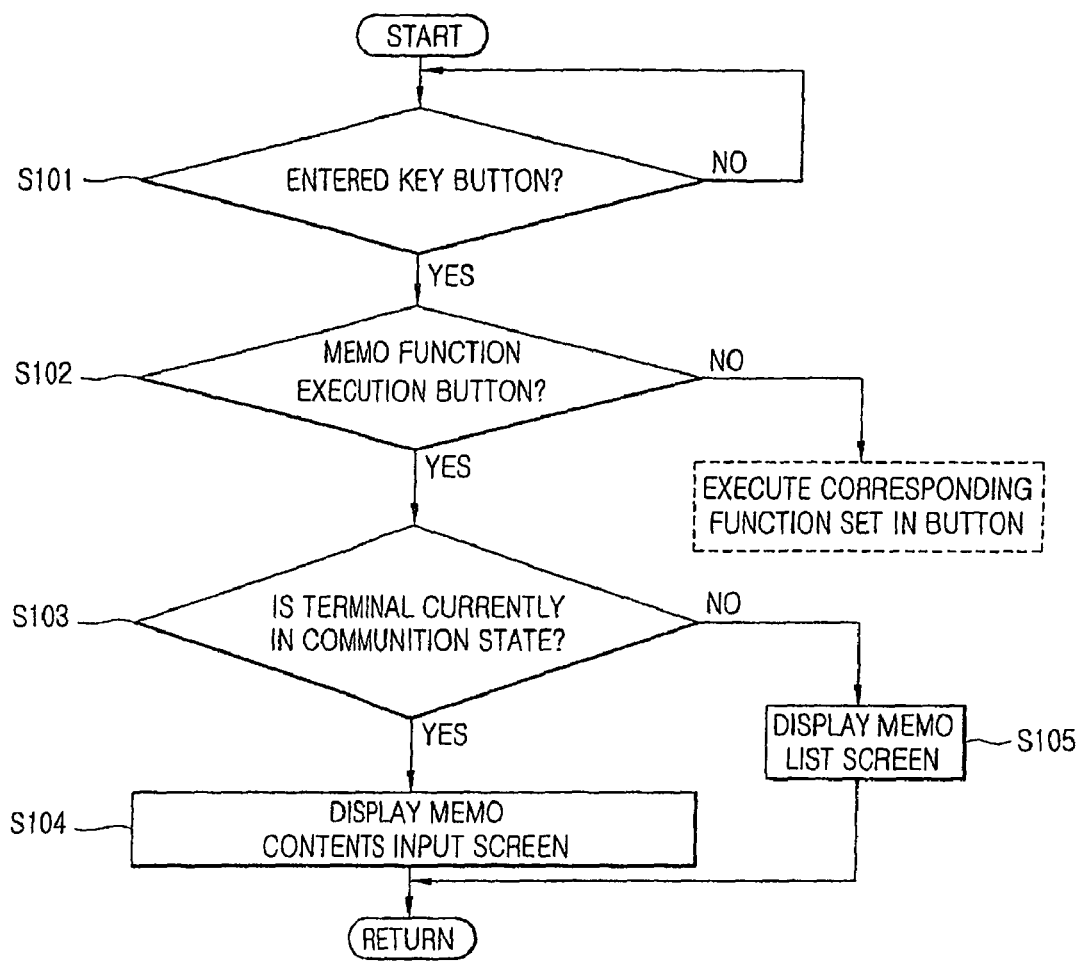
FIG. 7 is a flow chart illustrating sequential steps of a method for executing a memo function depending on whether a mobile communication terminal is in a communication state in accordance with an embodiment of the present invention.

FIG. 7 is a flow chart illustrating sequential steps of a method for executing a memo function based upon a communication state or a non-communication state in accordance with an embodiment of the present invention.

As illustrated in FIG. 7, when a certain key button is entered (S101), the controller 108 determines whether the key button is a button for executing the memo function (S102). When it is determined the key button is the memo function execution button, the controller 108 determines a current state of the mobile communication terminal (S103).

That is, the controller 108 determines whether the mobile communication terminal is currently in a standby state or in a communication state.

According to the determination, if the mobile communication terminal is currently in the communication state, the controller 108 displays a memo content input screen (S104), whereas if the mobile communication terminal is currently in the standby state, the controller 108 displays a memo list screen (S105).

The memo function execution screen displayed according to the state of the mobile communication terminal depends on the set environment information stored in the memory 105.

Therefore, when the memo function execution screen displayed is the memo list screen, the user can select a memo he intends to check from the list and then checks the memo contents therein. When the memo function execution screen displayed is the memo contents input screen, the user can compose a memo.

Figure 8:
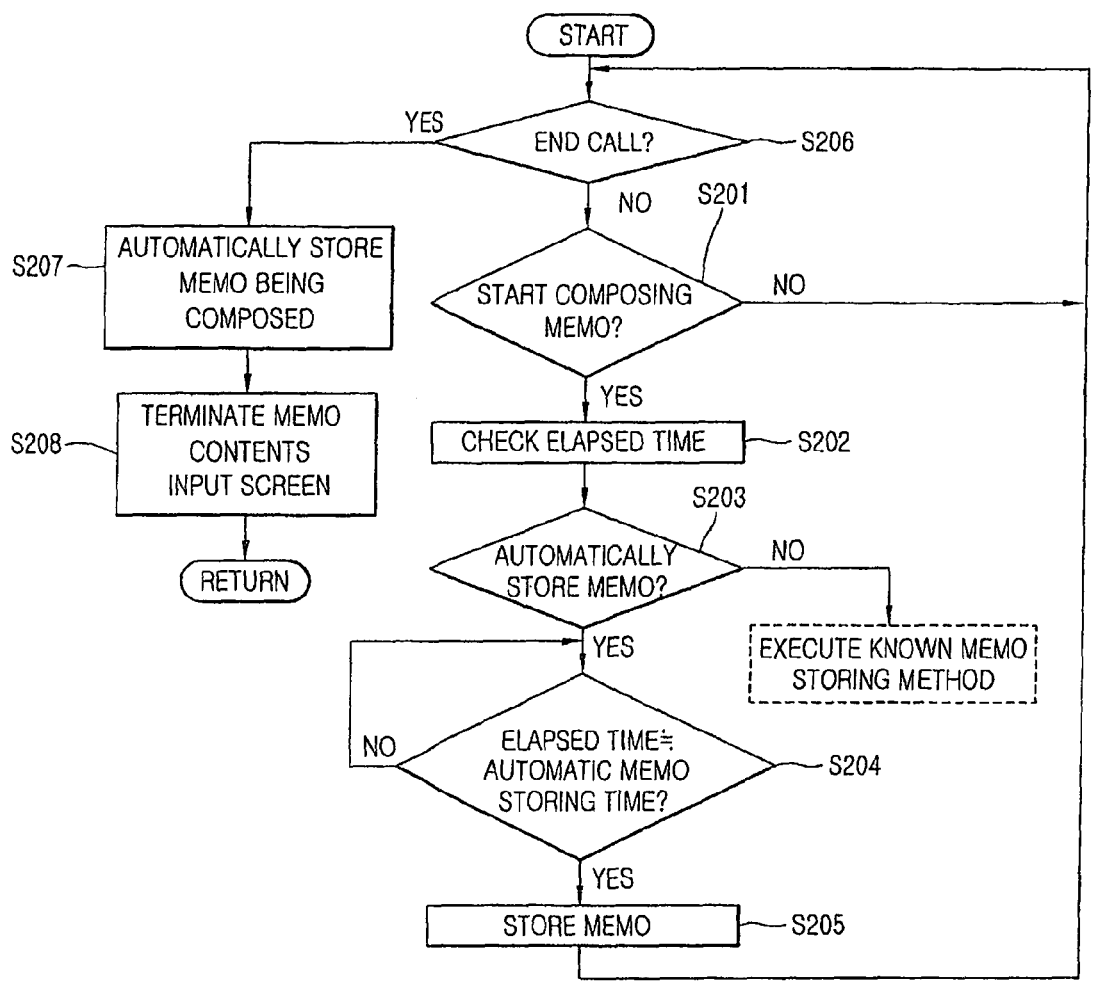
FIG. 8 is a flow chart illustrating sequential steps of a method for storing a memo while inputting memo contents in accordance with an embodiment of the present invention.

FIG. 8 is a flow chart illustrating sequential steps of a method for storing a memo while composing the memo contents in accordance with an embodiment of the present invention.

As illustrated in FIG. 8, the controller 108 determines whether a user starts composing a memo through the memo contents input screen (S201). Here, the controller 108 checks an elapsed time from a time point of starting to compose the memo (S202). The controller 108 determines whether an item for a memo storing method in the set environment information stored in the memory 105 has been set to an automatic storage (S203).

When the memo storing method has been set to the automatic storage, the controller 108 compares the elapsed time with information related to an automatic memo storing time stored in the memory 105 (S204). When the elapsed time matches the automatic memo storing time, the memo is automatically stored (S205).

In addition, the controller 108 detects whether the call is ended (S206). Upon ending the call, when the user forcibly terminates his mobile communication terminal habitually, or terminates the memo contents input screen without storing the memo contents which is being composed, the controller 108 automatically stores the memo which is being composed (S207), and then terminates the displaying of the memo contents input screen (S208). The storing method may automatically be executed even though any key is not separately entered.

Figure 9:
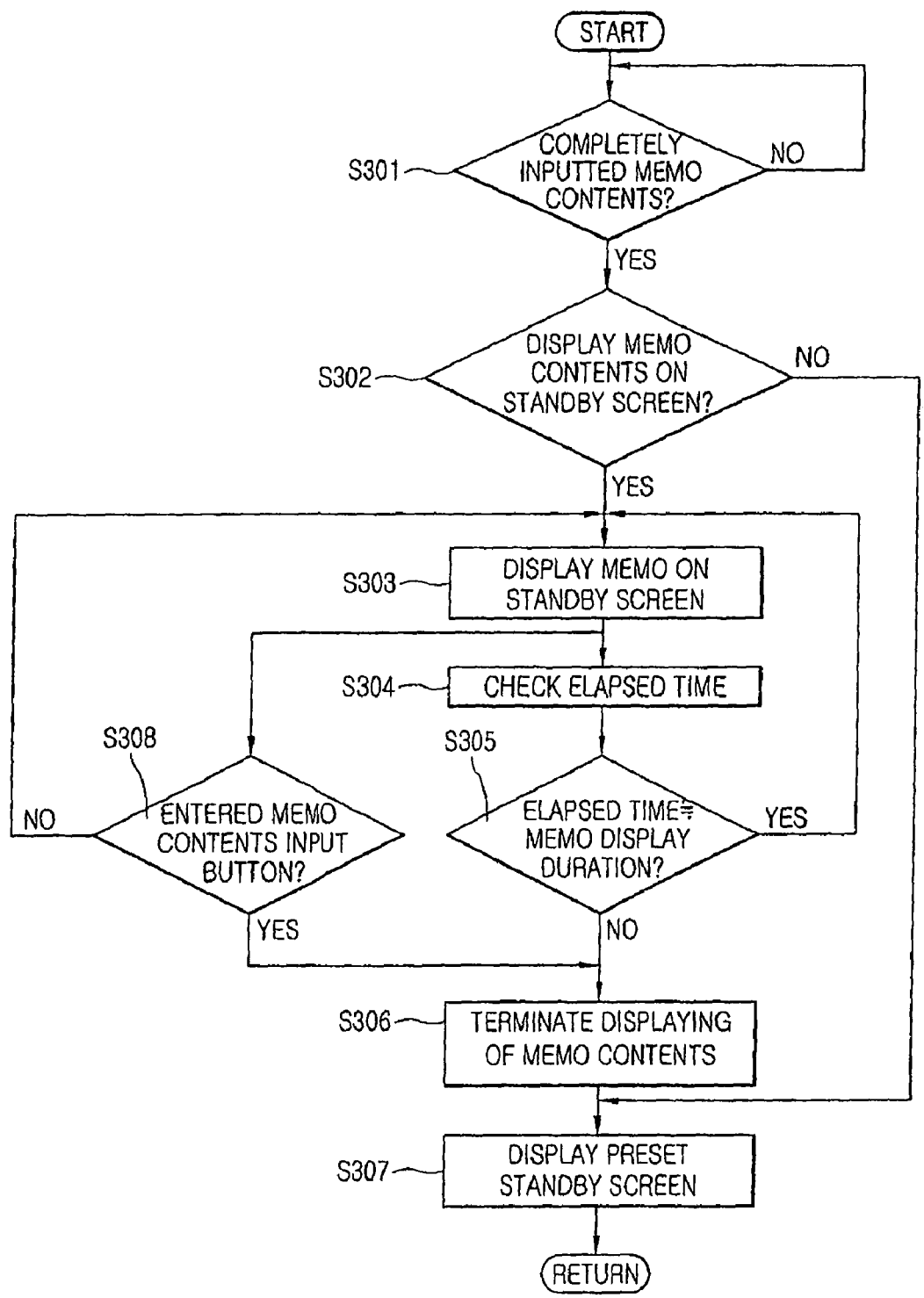
FIG. 9 is a flow chart illustrating sequential steps of a method for displaying a certain memo on a standby screen in accordance with an embodiment of the present invention.

FIG. 9 is a flow chart illustrating sequential steps of a method for displaying a certain memo on a standby screen in accordance with an embodiment of the present invention.

As illustrated in FIG. 9, the controller 108 determines whether the memo contents has completely been inputted (S301). That is, the controller 108 determines whether the state of the mobile communication terminal is changed into the standby state. The state of the mobile communication terminal can be determined according to whether the communication has been ended or a certain memo completion button equipped in the memo contents input screen has been entered.

When an item for displaying the memo contents on a standby screen has been set with reference to the set environment information stored in the memory 105 (S302), the controller 108 displays the completely inputted memo contents on the standby screen of the mobile communication terminal (S303). That is, the memo function is automatically executed to thus output the contents with respect to the certain memo onto the standby screen.

Here, the standby screen denotes a screen for displaying a memo on the display 107 in a standby state of the mobile communication terminal. For example, in the related art, certain images, photos, date and/or time were outputted onto the standby screen.

The memo displayed on the standby screen may be designated by allowing the user to select his desirable memo when there are many memos in the memo list. However, it may rather be preferable to automatically designate the most recently composed memo.

Here, the controller 108 checks an elapsed time from a time point of displaying the memo contents on the standby screen (S304), and compares the elapsed time with information related to the memo display time in the set environment information stored in the memory 105 (S305). When the elapsed time matches the memo display time, the controller 108 terminates the displaying of the memo contents (S306), and then rather displays the previously displayed standby screen (S307).

When the user enters a memo contents confirmation button while displaying the memo on the standby screen (S308), the controller 108 terminates the displaying of the memo contents (S306) to immediately display the previously displayed standby screen (S307).

Figure 10:
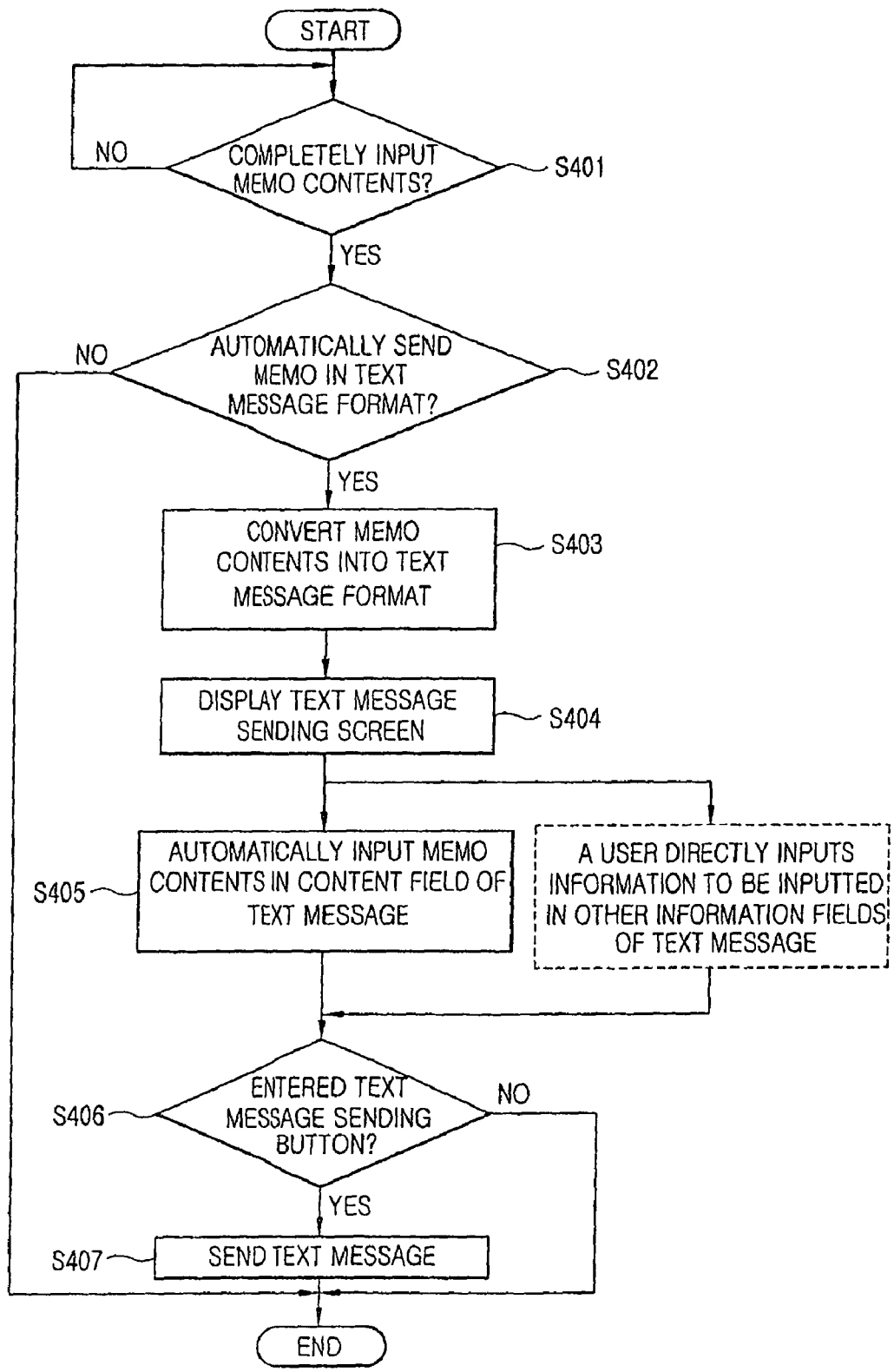
FIG. 10 is a flow chart illustrating sequential steps of a method for transmitting memo contents in a text message format in accordance with an embodiment of the present invention.

FIG. 10 is a flow chart illustrating sequential steps of a method for sending memo contents in a text message format in accordance with an embodiment of the present invention.

As illustrated in FIG. 10, the controller 108 determines whether memo contents are completely inputted (S401). It can be considered as the complete input of the memo contents when the communication is ended for the memo composed in the communication state, or it can be determined as the complete input of the memo contents when inputting a certain memo completion button equipped in the memo contents input screen.

When the item for sending the memo contents in the text message format has been set with reference to the set environment information stored in the memory 105 (S402), the controller 108 changes the completely inputted memo contents into a certain text message format (S403).

Next, the controller 108 displays a text message sending screen on the display 107 (S404), and then inputs the memo contents changed into the text message format into a content field among various information fields of the text message (S405). Hence, it is convenient for the user not to separately input the memo contents in the content field among the information fields for the text message to input information for sending the text message.

A generally known sending procedure may be used for a text message sending procedure to be performed thereafter. That is, when entering a certain text message sending button equipped in the text message sending screen (S406), the controller 108 sends the message to another party's phone number which is previously inputted by the user (S407).

Here, in order to fast change the memo function execution screen (i.e., the memo contents input screen) into the text message sending screen, it is preferable, as illustrated in FIG. 3, to additionally include a corresponding functional button (e.g., the text message sending button).

Hence, according to the present invention, by simply executing the memo function according to the state of the mobile communication terminal, the memo can easily be composed and the memo contents can easily be confirmed. In addition, the composed memo can be displayed on the standby screen to thus allow the user to recognize the memo composed and also to allow the user to immediately confirm the memo contents on the standby screen without undergoing a complicated menu selection procedure.

Furthermore, in the present invention, the memo can automatically be stored when ending a call or occasionally, and accordingly it is effective to enable a protection of a memo which may be lost due to an erroneous operation of the mobile communication terminal or a user's habit. In addition, the composed memo can immediately be sent in a text message format and thus the short message sending procedure can be simplified so as to improve the user's convenience.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

Furthermore, the mobile communication terminal may be configured to comprise a storage media receiving port that allows an external storage medium (such as a memory card) to be inserted thereto for storing data therein. Also, an additional (optional) function unit (such as a broadcast reception module, MP3 module, Internet banking module, etc.) may be provided.

Additionally, even though it would be too numerous to list all the features and variations that can be implemented in mobile communication terminals to accommodate and support the recent trend towards convergence of electronic and/or digital devices, those skilled in the art would easily understand that elements (i.e., hardware, software, or a combination thereof) that are equivalent to the function units and/or modules described above may be implemented in the mobile communication terminal in accordance with the present invention.

The present invention not only results in improved memo function in general calling process, but also, can be applied in any other current technology. Namely, Digital multimedia broadcasting (DMB) technologies (e.g., satellite DMB, terrestrial DMB, etc.), downloading streaming videos from Internet servers, performing multimedia communications via wireless interfaces (Wi-Fi, Wi-MAX, etc.) and the like, are some non-limiting examples of practical applications that would benefit from the teachings and suggestions of the present invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile communication terminal having an adaptive memo function, comprising:
    an input unit configured to receive a user input for executing a memo function and to receive a user input for setting an environment of the memo function;
    a display configured to selectively display one of a memo contents input screen and a memo list screen according to a state of the mobile communication terminal determined when a button designated for executing the memo function is pressed; and
    a controller operatively connected to the input unit and the display, the controller configured to
    display a screen for setting the environment of the memo function upon receiving the user input for setting the environment of the memo function,
    determine the state of the mobile communication terminal when the button is pressed,
    display the memo contents input screen when the mobile communication terminal is determined to be in a communication state, and
    display the memo list screen when the mobile communication terminal is determined to be in a standby state;
    wherein the pressing of the button is a first user input for executing the memo function, and
    wherein the memo contents input screen or the memo list screen is displayed according the state of the mobile communication terminal determined at the time when the button is pressed.

2. The mobile communication terminal of claim 1, further comprising:
    a memory configured to store information related to a set environment of the memo function.

3. The mobile communication terminal of claim 2, wherein the information related to the set environment includes information related to at least one of:
    an item for selecting whether to automatically executing the memo function;
    an item for selecting whether to display memo contents on a standby screen;
    an item for selecting whether to send the memo contents in a text message format;
    an item for setting a display duration of the memo contents on the standby screen; and
    an item for selecting a memo storage option.

4. The mobile communication terminal of claim 1, wherein the input unit comprises one of a key pad and a touch sensitive input device.

5. A method for executing an adaptive memo function of mobile communication terminal, the method comprising:
    receiving a user input for setting an environment of the memo function;
    displaying a screen for setting the environment of the memo function upon receiving the user input;
    storing information related to the environment;
    receiving a user input for executing a memo function, wherein the user input is pressing a button designated for executing the memo function;
    determining a state of the mobile communication terminal upon receiving the user input for executing the memo function; and
    selectively displaying one of a memo contents input screen and a memo list screen according to the stored information and the determined state of the mobile communication terminal,
    wherein the step of selectively displaying comprises:
        displaying the memo contents input screen when the mobile communication terminal is determined to be in a communication state; and
        displaying the memo list screen when the mobile communication terminal is determined to be in a standby state,
    wherein the user input for executing the memo function is a first user input related to the memo function, and
    wherein the memo contents input screen or the memo list screen is displayed according the state of the mobile communication terminal determined at the time when the first user input is entered.

6. The method of claim 5, wherein the information related to the set environment information includes information related to at least one of:
    an item for selecting whether to automatically execute the memo function;
    an item for selecting whether to display memo contents on a standby screen;
    an item for selecting whether to send the memo contents in a text message format;
    an item for setting a display duration of the memo contents on the standby screen; and
    an item for selecting a memo storage option.

7. The method of claim 5, wherein the step of receiving a user input for executing a memo function comprises:
    receiving the user input for executing the memo function via one of a key pad and a touch sensitive input device.

* * * * *